United States Patent [19]
Raque

[11] 3,901,375
[45] Aug. 26, 1975

[54] PACKAGE FEEDING AND TIMING MECHANISM

[75] Inventor: Robert G. Raque, Louisville, Ky.

[73] Assignee: FMC Corporation, San Jose, Calif.

[22] Filed: Feb. 4, 1974

[21] Appl. No.: 439,160

[52] U.S. Cl. ............................... 198/34; 198/170
[51] Int. Cl. ........................................ B65g 47/26
[58] Field of Search ............................. 198/34, 170

[56] References Cited
UNITED STATES PATENTS
3,589,497   6/1971   Leach .................................. 198/34

Primary Examiner—Evon C. Blunk
Assistant Examiner—Douglas D. Watts
Attorney, Agent, or Firm—C. E. Tripp

[57] ABSTRACT

A file of abutting packages are delivered one by one to a spacing conveyor operating at a higher velocity to interspace the packages. Normally upright retractable pushers, on a pusher conveyor having a reach adjacent the conveying reach of the spacing conveyor, will depress under the weight of a package which overlies the pusher, but will remain upright if the pusher coincides with the space between two adjacent packages. The pusher velocity exceeds the velocity of the spacing conveyor, and the pushers are held below the plane of the conveying path of the packages at the inlet end of the pusher conveyor. Thus, when a pusher coincides with the space between two adjacent packages, it will automatically erect and push the downstream package. If a pusher temporarily underlies a package, it is depressed until it advances downstream beyond that package and will automatically erect in the next open space between two packages. The disclosure further includes an overhead impulse roller which frictionally engages each package at the downstream end of the spacing conveyor to carry them onto a discharge conveyor that projects the packages into individual trays mounted on an adjacent receiving conveyor, thus feeding and timing the initially abutting packages into the spaced trays.

6 Claims, 9 Drawing Figures

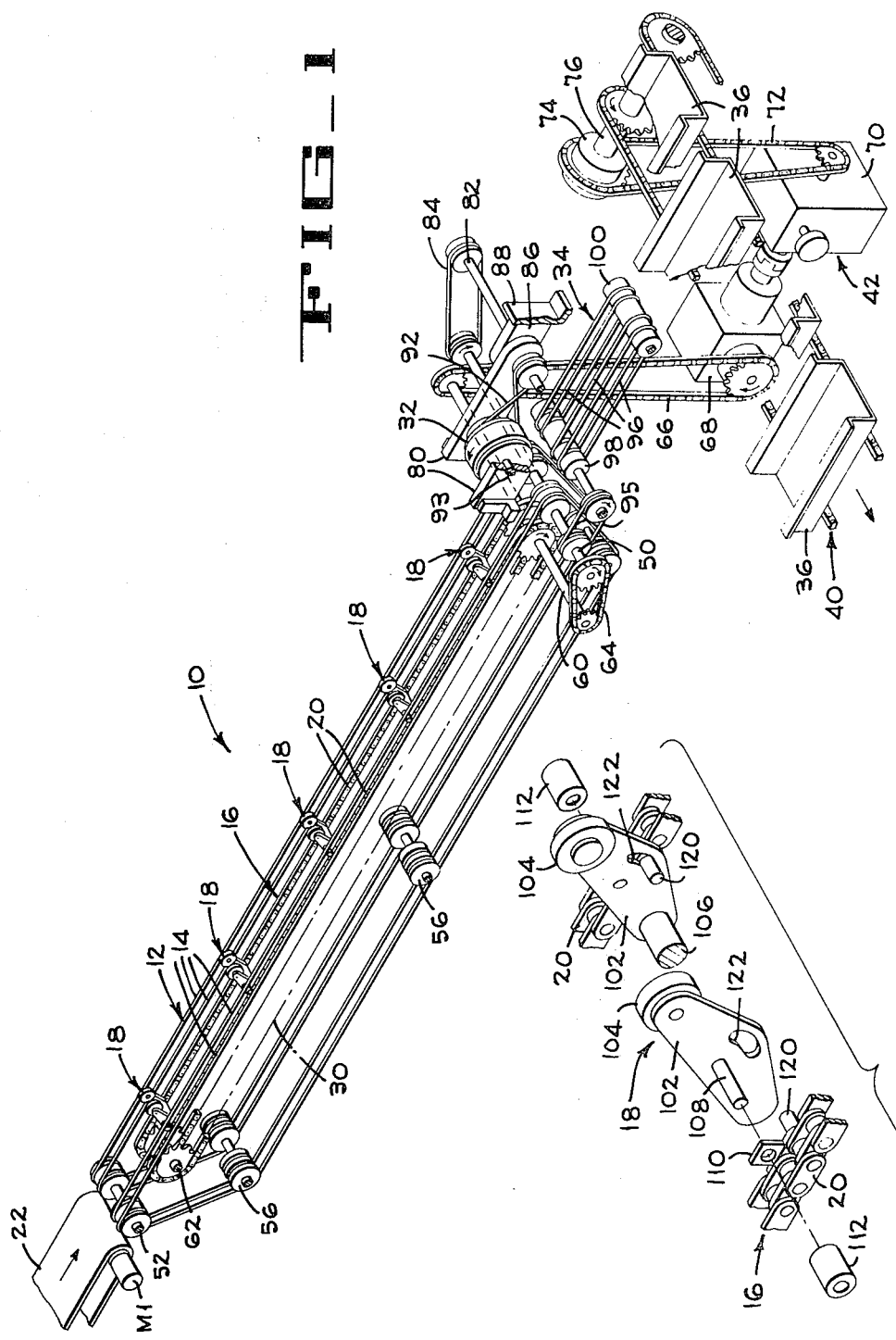
FIG_1
FIG_2

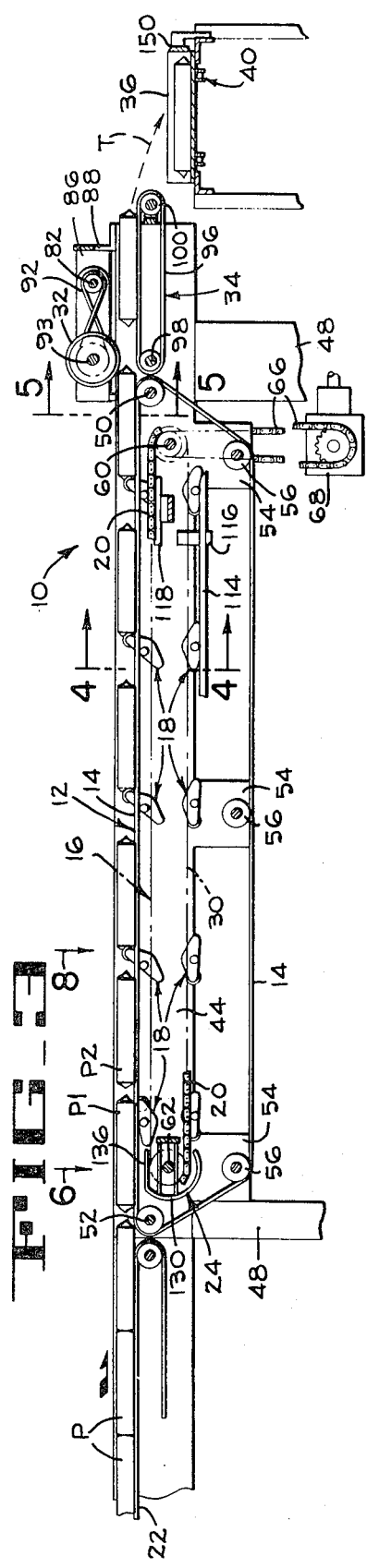

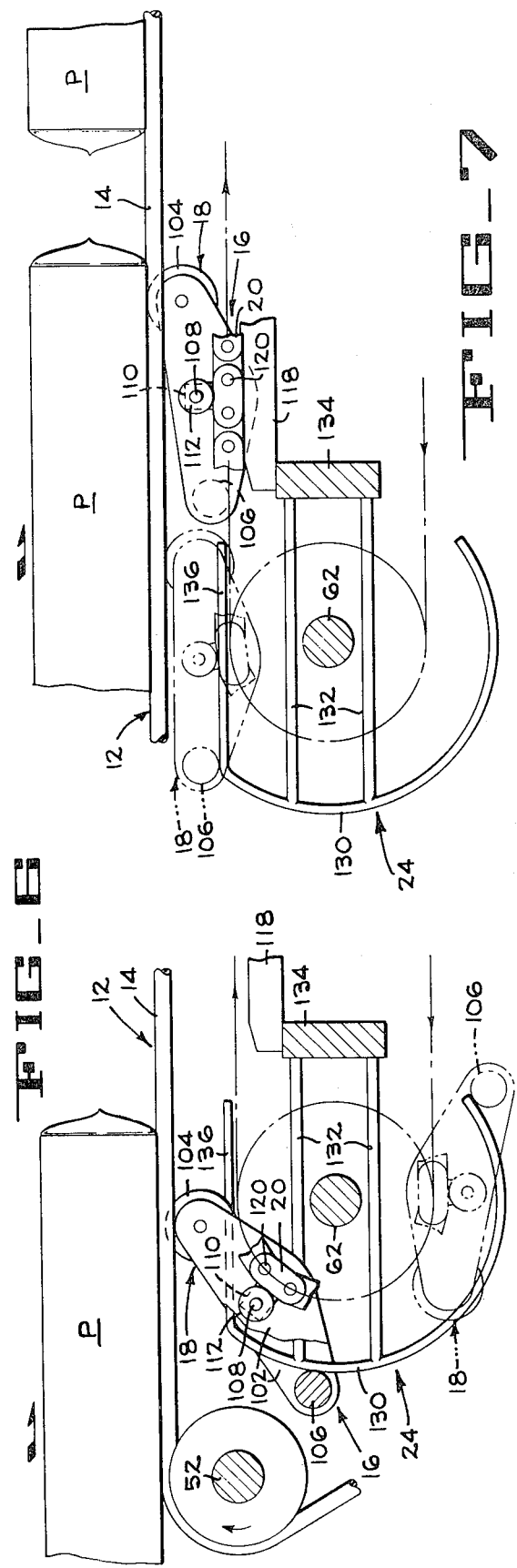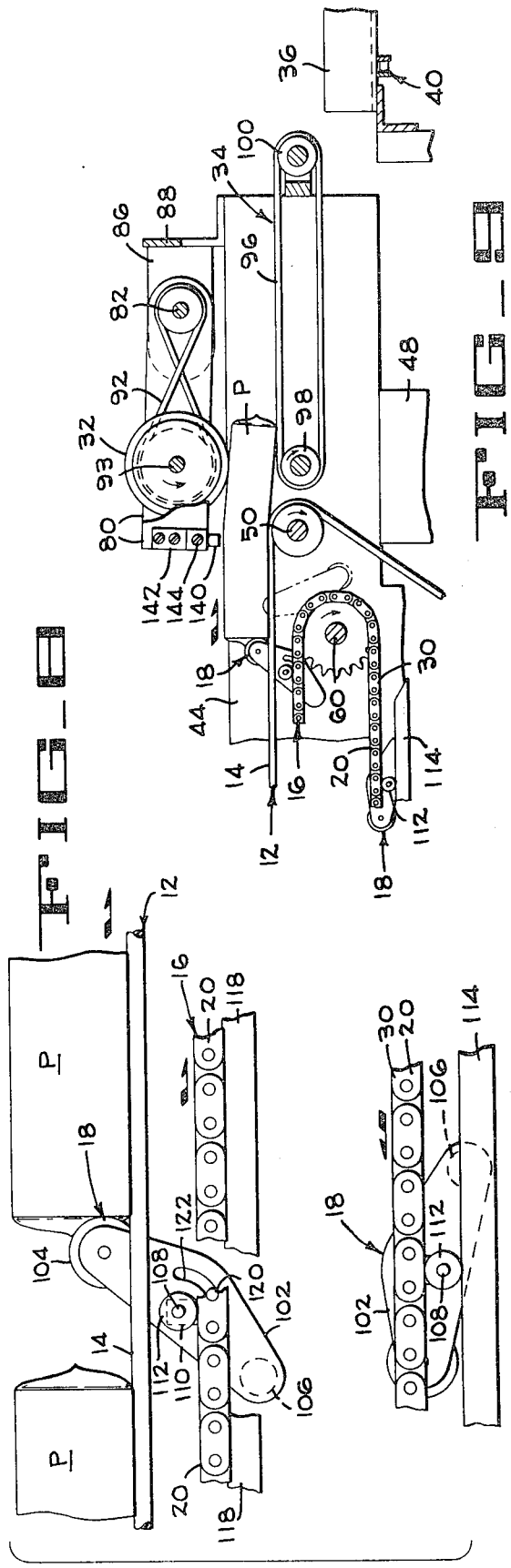

PACKAGE FEEDING AND TIMING MECHANISM

BACKGROUND OF THE INVENTION

The field of the present invention pertains to package feeding mechanisms for interspacing a file of abutting packages and conveying them to a receiving conveyor with the articles accurately timed into spaced trays on the receiving conveyor.

The general problem to which the present invention is directed is that of accurately timing and feeding a file of relatively flexible packages fed at an indiscriminate rate, to a continuously driven receiving conveyor which transports the packages to further downstream processing machines. More particularly, the packages in the present instance contain bread product and the outer wrapper is a relatively soft plastic material. These characteristics make it relatively difficult to accurately control the movement of the packages, as contrasted, for example, to rigid cartons which withstand more severe handling conditions.

In accordance with the present invention, relatively soft, flexible packages, which can vary a small amount both in length and height, are accurately timed and fed, with continuous motion, to a continuously driven receiving conveyor in spaced relation for subsequent packaging operations.

SUMMARY OF THE INVENTION

A file of abutting incoming packages is fed by a delivery conveyor onto a spacing conveyor which accelerates the leading package away from the succeeding package, so that the packages become interspaced and their trailing ends are accessible to pusher flights on a pusher conveyor underlying the spacing conveyor. Each pusher is gravity-biased to its erect position and it automatically erects when it coincides with a space between two adjacent packages. Since the pusher conveyor velocity exceeds that of the spacer conveyor, each package is accelerated away from the preceding package, and at the discharge end of the spacing conveyor an overhead friction drive roller assumes driving control of the packages while the pushers disengage the package and follow the return reach of the pusher conveyor. The friction drive roller, and a cooperating discharge conveyor underlying the package then accelerate the package and project it off the end of the discharge conveyor to follow a free trajectory into a moving tray on a receiving conveyor. The latter conveyor operates continuously and has a spaced series of trays for conveying the packages to other processing machinery such as packaging means. The drive train for the package feeding and driving mechanism originates with the receiving conveyor, thus maintaining the timed relation of the pushers with the moving trays on the receiving conveyor.

According to one feature of the present invention, the pushers travel faster than the packages and thus seek and occupy the first accessible space between two adjacent packages, since they automatically erect by gravity. According to another feature of the invention, the pushers travel only about 10 percent faster than the packages, so that when a pusher erects into pushing relation with the package the acceleration of the package is relatively gentle and non-damaging to the flexible packages. Another feature is a vertically displaceable friction drive roller which assumes driving control of the packages as the pushers deliver the packages to the discharge conveyor. The roller will thus accommodate height variations among the packages and the roller and the discharge conveyor project the packages in a free trajectory off the discharge end of the underlying discharge conveyor.

According to a preferred embodiment of the present invention, the mechanism includes means for sequentially accelerating incoming packages into interspaced relation and conveying them along a given path. A series of depressible chain-mounted package pushers are movable along the path, and each pusher includes rollers to facilitate relative longitudinal movement between a package and a pusher held down by a package moving along the path. Each pusher further includes a side plate adjacent each of two mounting chains, and a pivot connection between each chain and the intermediate portion of each of the associated side plates. The rollers are mounted on one end of each side plate, and a weight connects the other ends of said side plates to pivotally bias the side plates and position the rollers in pushing relation with a package. A stop is mounted on at least one chain and is engaged with the adjacent side plate for limiting pivotal motion of the pusher. The pusher chains are driven at a velocity different than the velocity of the packages so that a pusher which does not coincide with the space between two adjacent packages is temporarily depressed by a package until the pusher underlies a space between two packages.

BRIEF DESCRIPTION OF THE DRAWINGS

FIG. 1 is a diagrammatic perspective of the package feeding and timing mechanism of the present invention installed intermediate a feed conveyor and a receiving conveyor.

FIG. 2 is an exploded diagrammatic perspective of one of the pushers utilized in the package feeding and timing mechanism.

FIG. 3 is a diagrammatic longitudinal section through the apparatus shown in FIG. 1.

FIG. 4 is an enlarged vertical diagrammatic section taken along lines 4—4 on FIG. 3.

FIG. 5 is an enlarged vertical diagrammatic section taken along the lines 5—5 on FIG. 3.

FIG. 6 is an enlarged operational diagrammatic section of the area indicated by the arrow 6 on FIG. 3.

FIG. 7 is a view similar to FIG. 6, but showing a different operational condition.

FIG. 8 is a view showing an operational condition succeeding those shown in FIGS. 6 and 7, and is indicated by the arrow 8 on FIG. 3.

FIG. 9 is an enlarged longitudinal fragmentary diagrammatic section of the discharge end of the apparatus shown in FIG. 3.

DESCRIPTION OF THE PREFERRED EMBODIMENT

In brief outline, the package feeding and timing mechanism 10 (FIG. 1) includes a spacer conveyor 12 comprising a plurality of round belts 14, the upper reach of which cooperates with the upper reach of a pusher conveyor 16. Mounted on the pusher conveyor are a spaced series of pushers 18 which are pivotally connected to a pair of chains 20. As will later be described, the pushers are weighted and gravity-biased toward upright positions where they follow the path of packages supported by the spacer conveyor. A file of abutting packages P (FIG. 3) are delivered to the package feeding and timing mechanism 10 by a feed conveyor 22, which may take various conventional forms, the details of which are not critical to the present invention.

The feed conveyor 22 (FIG. 1) is preferably driven by a variable speed motor M1, and adjusted so that the delivery speed of the packages P is less than the conveying speed of the spacer conveyor belts 14. Thus, as each package is delivered onto the spacer conveyor 12, it is accelerated relative to the belts 14 away from the preceding package to create a space therebetween, and the space increases as the packages are transported by the spacer conveyor. As each pusher 18 (FIG. 3) approaches the upper reach and the packages, it is held in a retracted position by camming means 24 in order to prevent the pusher from upwardly displacing the package until it starts to follow the upper reach. If a package overlies the pusher, as shown for the pusher 18 and the package P1, the weight of the package will keep the pusher depressed until it advances forwardly beyond the package into a space between the leading end of the package and the trailing end of the next downstream package P2. Since that pusher is no longer held down, it automatically erects and contacts the trailing end of the package P2 to convey the package at the transport speed of the pusher. At the discharge end of the pusher conveyor 16, the pushers 18 descend to follow a return reach 30, and thus disengages the package.

Before the pushing engagement of a pusher and a package is terminated, an overhead friction drive roller 32 engages the upper surface of the package and accelerates it slightly so that the pusher, in moving to the lower reach 30, is positively disengaged from the package. The roller 32 cooperates with an underlying discharge conveyor 34, and the package is projected in a free trajectory off the end of the discharge conveyor 34 into a moving tray 36. A receiving conveyor 40 carries a plurality of equally spaced trays 36, and is continuously driven to successively index a tray with the discharge conveyor 34 for each package projected therefrom. A drive train, generally indicated at 42, connects the receiving conveyor 40 to the spacer conveyor 12, the pusher conveyor 16, and the friction drive roller 32, so that all of these components are driven in timed relation to the movement of the trays 36.

With more specific reference to the detailed structure, the package feeding and timing mechanism 10 (FIGS. 3 and 4) includes spaced side plates 44 and 46 supported by floor-engaging legs 48. Rotatably mounted between the side plates 44 and 46 are drive and idler shafts 50 and 52, respectively, for the pulleys mounting the belts 14 of the spacer conveyor 12. Depending extension plates 54 of the side plates 44 and 46 support idler rollers 56 for the lower return reach of the spacer conveyor belts 14. Similarly, drive and idler sprockets for the pusher conveyor 16 are respectively mounted on drive and idler shafts 60 and 62 which extend between the side plates 44 and 46.

As shown in FIG. 1, the drive shaft 60 is connected to the drive shaft 50 by chain and sprocket drive unit 64 to drive the spacer conveyor 12 and the pusher conveyor 16 in timed relation, and the drive shaft 60 is connected by chain sprocket drive unit 66 to a gear box 68. The gear box 68 is coupled to a variable speed drive unit 70, the latter being powered by a chain and sprocket drive 72 coupled to a mechanically operated clutch 74 which is connected to the tail shaft 76 of the receiving conveyor 40. When the clutch is engaged and the receiving conveyor is driven, the spacer conveyor 12, the pusher conveyor 16, the friction drive roller 32, and the discharge conveyor 34 are all driven in timed relation to the trays 36 on the receiving conveyor, as previously mentioned. The friction drive roller 32 (FIG. 1) is carried between two swing arms 80 that are pivotable about the axis of a driven shaft 82 mounted in bearings 83 (FIG. 5) on the swing arms. For driving the shaft 82, the drive shaft 50 of the spacer conveyor 12 is coupled by a belt and pulley drive unit 84 to the shaft 82. Supporting the shaft 82 are a pair of spaced support blocks 86, only one of which is shown, that are secured to the vertical leg of an angle bar 88 (FIGS. 3 and 5) that is mounted atop of the outwardly projecting flanges 90 of the side walls 44 and 46. In order to provide ample clearance from the packages, the vertical leg is cut away along the dotted line 91 (FIG. 5). A pulley and belt drive unit 92, which is twisted into a figure 8 to provide the proper drive direction, transfers power from the shaft 82 to a shaft 93, mounted in bearings 94 (FIG. 5) on the free ends of the swing arms 80, which shaft carries the friction drive roller 32. The discharge conveyor 34 (FIG. 1) which underlies the friction drive roller 32 is driven by a belt and pulley drive unit 95 from the driven shaft 50, and includes a plurality of round belts 96 trained around drive and idler pulleys 98 and 100, respectively.

With reference to FIG. 2, each pusher 18 includes a side plate 102, pivotally connected to the adjacent run of the conveying chains 20. The package-contacting end of each side plate 102 comprises a roller 104, and the opposite end of the side plates are interconnected by a weight 106 intermediate said ends. Each side plate is provided with a laterally, outwardly projecting pivot pin 108 which extends through a chain attachment link 110 and a roller 112. As shown in FIG. 4, the rollers 112 guide the return reach of the pusher conveyor 16 by engaging support tracks 114. The tracks 114 are supported by L-shaped brackets 116 which depend from the side plates 44 and 46. In similar manner, guide tracks 118 support the upper reach of the pusher conveyor 16 to maintain that reach planar between its input and output ends.

To limit pivotal movement of the side plates 102 (FIG. 2) about the axes of the pivot pins 108, each chain run 20 includes a laterally projecting pin 120 which projects through an arcuate slot 122 in the adjacent side plate 102. The uppermost pusher 18 in FIG. 8 illustrates the erected position of the pusher when no package overlies the rollers 104, and the weight 106 is thus effective to erect the pusher. In FIG. 7, the solid line pusher 18 is near its downward limit of movement. On the return reach of the pusher conveyor 16, the pushers 18 (FIG. 8) are overbalanced by the weight 106 to the position shown for the lowermost pusher.

Thus, if the pusher was free and moved from the phantom line position in FIG. 6 upwardly around the shaft 62, the rollers 104 would ascend nearly vertically and lift the package P from the spacer conveyor 12. In order to prevent this, guide rod 130 is supported centrally of the pusher and spacer conveyors 16 and 12 by support rods 132 secured to a fixed crossbar 134 that is connected to the side plates of the machine. In this position, the guide rod 130 intercepts the weight 106 of each pusher carried around the axis of the shaft 62 to the upper reach of the pusher conveyor. As a result, the weight 106 is ineffective to swing the pusher about its pivot pins 108, and the rollers 104 follow a path which keeps them clear of the bottom surface of the overlying package P until the pushers advance slightly downstream from the shaft 62.

For this purpose, the weight 106 of the phantom line pusher 18 in FIG. 6 intercepts the underside of guide rod 130 and is carried around to its full line position without the roller 104 contacting the package P. As shown in phantom outline in FIG. 7, the pusher 18 attains a substantially horizontal position when it is vertically above the shaft 62, because the weight 106 is supported upon a horizontal extension 136 of the guide rod 130. However, as soon as the pusher attains the full line position shown in FIG. 7, the weight 106 is unsupported by the guide rod extension 136 and the weight therefore tends to raise the rollers into contact with the package P.

If a package is overlying the rollers 104 as shown in FIG. 7, the weight of the package is sufficient to keep the rollers depressed until the pusher 18 travels downstream beyond the end of the package, at which time the weight will pivot the pusher counterclockwise about the axes of the pivot pins 108 and elevate the roller into the open space between the two adjacent packages. If the downstream package P happens to be slightly longer than normal, the space between packages will accordingly be less and the rollers 104 might therefore not have space to elevate between the packages. In such case, and further assuming that the packages are so close that the speed differential between the pushers 18 and the spacing conveyor 12 is such that the interspacing does not increase to the point where the rollers 104 have room to rise between the packages, the rollers will roll under the next downstream package and erect automatically into the next open space between adjacent packages. The latter space is of course larger than the preceding upstream space, due to the fact that the pushers travel faster than the packages.

In an actual embodiment of the package feeding and timing mechanism 10, the packages P were approximately 8 inches long, the space between the pusher rollers 104 on the upper reach was approximately 12 inches, and the velocity of the pushers exceeded the velocity of the spacer conveyor 12 by about 10 percent. With this arrangement, it is inevitable that approximately 10 percent of the packages will be missed by a pusher. Of course, this means that 10 percent of the trays 36 on the receiving conveyor 40 will be empty. In order to reduce the number of empty trays, the package feeding and timing mechanism 10 must be increased in length. However, in order to fill every tray would require an infinitely long machine. In the present case, the empty trays work to advantage because during down time when the package feeding and timing mechanism 10 is not operating, packages are elsewhere accumulated and then are later fed into the empty trays 36 on the receiving conveyor 40 so that at the discharge end (not shown) of the receiving conveyor all of the trays are filled.

A package P, once engaged by a pusher 18 as shown in FIG. 8, is accelerated downstream relative to the spacer conveyor 12. When that package arrives at the discharge end of the spacer conveyor 12 (FIG. 9), its leading end rides under the friction drive roller 32. As soon as the roller 32 has sufficient frictional engagement with the package, the package is rapidly pulled away from the pusher 18 in order to avoid damaging the package as the roller descends around the drive shaft 60, because the pusher is then free to pivot to the phantom outline position shown and could otherwise damage the package as the weighted end of the pusher elevates above the conveying plane of the spacer conveyor 12. In conjunction with the discharge conveyor 34, the belts of which travel at the same linear velocity as the peripheral speed of the friction drive roller 32, the package then is rapidly ejected over the discharge end of the discharge conveyor into a free trajectory T (FIG. 3) to fall into the moving tray 36 indexed with that package.

It will be seen in FIG. 9 that the conveying surface of the discharge conveyor 34 lies slightly below the conveying plane of the spacer conveyor 12. Thus, as the package overhangs the discharge end of the spacer conveyor 12, it bends downwardly due to its flexibility, and its upper surface presents an inclined surface to the lower sector of the friction drive roller 32 so that the package positively runs under the roller. Meanwhile, the weight of the swing arms 80 and the roller 32, plus the pivotal mounting of that assembly about the shaft 82, provides gravity-urged downward pressure against the package.

If a taller than usual package P is moved under the friction drive roller 32, the pivotal mounting of the roller assembly allows the roller to deflect upwardly and still maintain positive driving engagement with the package. In the absence of a package lifting the roller 32, the swing arms 80 are prevented from lowering the roller to a position where no package can enter, by means of a depending stop member 140 (FIG. 5) on the free end portion of each swing arm. Each stop 140 is held in a bracket 142 that is secured to each swing arm 80, and is arranged to contact the adjacent flange 90 of the side plate 44 or 46 to limit downward movement of the swing arms. Each stop member 140 comprises a short segment of tubular belting material which is vertically adjustable in the bracket 142 by set screw 144.

When the discharge conveyor 34 (FIG. 3) projects the package P to follow the free trajectory path T toward and into the tray 36 positioned to receive that package, overtravel of the package beyond the remote open end of the tray 36 is prevented by an elongate strap 150 which is fixed to the frame of the receiving conveyor 40 to form a backstop.

From the preceding description, it is evident that the package feeding and timing mechanism 10 will gently handle flexible packages with continuous conveying movement at relatively high rates, and is particularly adapted to cooperate with package receiving means that is also in continuous motion.

Although the best mode contemplated for carrying out the present invention has been herein shown and described, it will be apparent that modification and variation may be made without departing from what is regarded to be the subject matter of the invention.

What is claimed is:
1. Package feeding apparatus comprising means for feeding a file of abutting packages, conveying means comprising a plurality of endless belts for sequentially accelerating said packages from said feeding means into interspaced relation and conveying them along a given path, a pair of spaced endless chains, pushers carried by said chains to provide endless series of package pushers having an upper reach of pushers movable along said path, means mounting each of said pushers for depressible movement below said path, and means for driving said pushers at a velocity exceeding the velocity of said packages, each of said pushers not coinciding with the space between two adjacent packages being temporarily depressed by a package until the pusher advances to the next space between two packages, rollers on each pusher to facilitate relative longitudinal movement between a depressed pusher and a package moving along said path, each pusher including a side plate adjacent each chain, said pusher mounting means comprising a pivot connection between each chain and a portion of the associated side plate that is intermediate the ends of the side plate, said rollers being mounted on one end of each side plate, a weight connecting the other ends of said side plates to pivotally bias said side plates and position said rollers in pushing relation with a package, and a stop mounted on each chain and engaged with the adjacent side plate for limiting pivotal motion of said pusher.

2. Apparatus according to claim 1, wherein said chains have a substantially horizontal upper and lower reaches trained around sprockets on a common shaft at the inlet end of said package feeding apparatus, and guide means engaged by said weight for pivoting said pusher and maintaining said rollers below the plane of said conveying means until said rollers pass downstream beyond said shaft.

3. Apparatus according to claim 2, wherein said pusher disengages the package upstream of the terminal end portion of said conveying means, and a driven roller frictionally engaging the upper surface of said packages to maintain driving engagement therewith after said pusher disengagement.

4. Apparatus according to claim 3, and a discharge conveyor having an upstream end portion underlying said driven roller, and means for driving said discharge conveyor at a velocity projecting the package from the discharge end of said discharge conveyor.

5. Apparatus according to claim 4, and a receiving conveyor extending across the discharge end of said discharge conveyor, a drive train for continuously driving said receiving conveyor, said pusher chains and said conveying means, and a plurality of upwardly open trays on said receiving conveyor, successive moving trays momentarily indexing to sequentially receive the packages projected from said discharge conveyor.

6. Package feeding apparatus comprising means for feeding a file of abutting packages, a plurality of endless belts for sequentially accelerating said packages from said feeding means into interspaced relation and conveying them along a given path, a series of depressible package pushers movable along said path, a pair of spaced endless chains carrying said pushers; each pusher including roller means to facilitate relative longitudinal movement between a depressed pusher and a package moving along said path, each pusher comprising a side plate adjacent each chain, a pivot connection between each chain and the intermediate portion of each of the associated side plates, said roller means comprising a roller mounted on one end of each side plate, a weight connecting the other ends of associated side plates to pivotally bias said side plates and position said rollers in between adjacent packages, a stop mounted on one of said chains and engageable with the adjacent side plate for limiting pivotal motion of said pusher, and means for driving said pusher chains at a velocity differing from the velocity of said packages, each of said pushers which does not coincide with the space between two adjacent packages being temporarily depressed by a package until the pusher underlies a space between two packages.

\* \* \* \* \*